3,536,723
p-(2-ALKYLOXY-BENZOYL)-AMINOBENZO-
ATES OF n-DIALKYLAMINE-ALKYL AND
THEIR QUATERNARY SALTS
Mario Ghelardoni, Florence, Filippo Russo, Giarre, and
Nicola Pisanti and Giovanna Volterra, Florence, Italy,
assignors to A. Menarini Societa in Accomandita Semplice, Florence, Italy, a Italian corporate body
No Drawing. Filed Sept. 19, 1967, Ser. No. 668,949
Claims priority, application Italy, Sept. 27, 1966,
22,519/66
Int. Cl. C07c *103/86*
U.S. Cl. 260—294.3        30 Claims

ABSTRACT OF THE DISCLOSURE

The invention is concerned with p-(2-alkyloxy-benzoyl)-aminobenzoates of N-alkylamino-alkyl, the quaternary ammonium salts thereof and their preparation. These compounds have antispastic-spasmolytic activities and coronary-dilatory properties.

The present invention relates to new chemical compounds and the preparation thereof.

An object of the present invention is to provide new chemical compounds having valuable therapeutic properties.

A further object of the present invention is to provide new chemical compounds having anti-spastic-spasmolytic activities and coronary-dilatatory properties.

The present invention is concerned with p-(2-alkyloxy-benzoyl)-aminobenzoates of N-alkylamino-alkyl, corresponding to the following general structural Formula I:

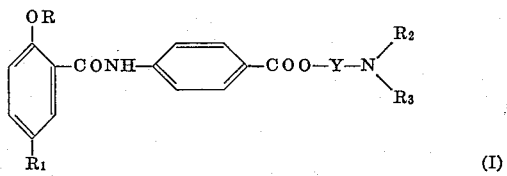

and to their quaternary salts corresponding to the following general structural Formula II:

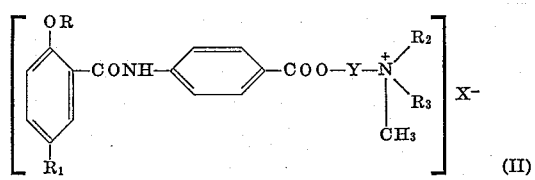

wherein R is an alkyl group containing 1 to 12 carbon atoms; $R_1$ is an atom of H or a halogen substituent; Y is a straight or branched alkyl chain containing 2 or 3 atoms of carbon; $R_2$ and $R_3$ are alkyl groups containing 1 or 2 atoms of carbon, or saturated heterocyclic radicals; X is an anion such as bromide, chloride, iodide or sulphate.

Compounds included within the general structural Formula I may be:

(1) p-(2-methoxy-benzoyl)-aminobenzoate of N-diethylamino-ethyl
(R=CH$_3$; R$_1$=H; Y=(CH$_2$)$_2$; R$_2$=R$_3$=C$_2$H$_5$)
(melting point=57–59° C.).

(2) p-(2-ethoxy-benzoyl)-aminobenzoate of N-diethylamino-ethyl
(R=C$_2$H$_5$; R$_1$=H; Y=(CH$_2$)$_2$; R$_2$=R$_3$=C$_2$H$_5$).
(melting point=94–96° C.).

(3) p-(2-ethoxy-benzoyl)-aminobenzoate of N-dimethylamino-isopropyl
(R=C$_2$H$_5$; R$_1$=H; Y=CH$_3$—CH—CH$_2$;
R$_2$=R$_3$=CH$_3$)
(melting point=106–109° C.).

(4) p-(2-ethoxy-benzoyl)-aminobenzoate of N-piperidino-ethyl
(R=C$_2$H$_5$; R$_1$=H; Y=(CH$_2$)$_2$; R$_2$, R$_3$=C$_5$H$_{10}$)
(melting point=135–137° C.).

(5) p-[2-(n-butoxy)-benzoyl]-aminobenzoate of N-diethylamino-ethyl
(R=n-C$_4$H$_9$; R$_1$=H; Y=(CH$_2$)$_2$; R$_2$=R$_3$=C$_2$H$_5$)
(melting point=81–82° C.).

(6) p-[2-n-amyloxy)-benzoyl]aminobenzoate of N-diethyl-amino-ethyl
(R=n-C$_5$H$_{11}$; R$_1$=H; Y=(CH$_2$)$_2$; R$_2$=R$_3$=C$_2$H$_5$)
(melting point=70–72° C.).

(7) p-[2-(n-octyloxy)-benzoyl]-aminobenzoate of N-diethyl-amino-ethyl
(R=n-C$_8$H$_{17}$; R$_1$=H; Y=(CH$_2$)$_2$; R$_2$=R$_3$=C$_2$H$_5$)
(melting point=41–42° C.).

(8) p-[2-(n-nonyloxy)-benzoyl]-aminobenzoate of N-diethyl-amino-ethyl
(R=n-C$_9$H$_{19}$; R$_1$=H; Y=(CH$_2$)$_2$; R$_2$=R$_3$=C$_2$H$_5$)
(chlorohydrate melting point 127–129° C.).

(9) p-[2-(n-decyloxy)-benzoyl]-aminobenzoate of N-diethyl-amino-ethyl
(R=n-C$_{10}$H$_{21}$; R$_1$=H; Y=(CH$_2$); R$_2$=R$_3$=C$_2$H$_5$)
(hydrochloride melting point=132–134° C.).

(10) p-[2-(n-dodecyloxy)-benzoyl]-aminobenzoate of N-diethyl-amino-ethyl
(R=n-C$_{12}$H$_{25}$; R$_1$=H; Y=(CH$_2$)$_2$; R$_2$=R$_3$=C$_2$H$_5$)
(hydrochloride melting point=140–142° C.).

(11) p-(2-methoxy-5-chloro-benzoyl)-aminobenzoate of N-diethyl-amino-ethyl
(R=CH$_3$; R$_1$=Cl; Y=(CH$_2$)$_2$; R$_2$=R$_3$=C$_2$H$_5$)
(melting point=81–82° C.).

(12) p-(2-ethoxy-5-chloro-benzoyl)-aminobenzoate of N-diethyl-amino-ethyl
(R=C$_2$H$_5$; R$_1$=Cl; Y=(CH$_2$)$_2$; R$_2$=R$_3$=C$_2$H$_5$)
(melting point=111–113° C.).

(13) p-[2-(n-butoxy)-5-chloro-benzoyl]-aminobenzoate of N-diethylamino-ethyl
(R=n-C$_4$H$_9$; R$_1$=Cl; Y=(CH$_2$)$_2$; R$_2$=R$_3$=C$_2$H$_5$)
(melting point=86–87° C.).

(14) p-[2-(n-amyloxy)-5-chloro-benzoyl]-aminobenzoate of N-diethylamine-ethyl
(R=n-C$_5$H$_{11}$; R$_1$=Cl; Y=(CH$_2$)$_2$; R$_2$=R$_3$=C$_2$H$_5$)
(melting point=85–86° C.).

(15) p-[2-(n-octyloxy)-5-chloro-benzoyl]-aminobenzoate of N-diethylamino-ethyl
(R=n-C$_8$H$_{17}$; R$_1$=Cl; Y=(CH$_2$)$_2$; R$_2$=R$_3$=C$_2$H$_5$)
(melting point=63–64° C.).

Compounds included within the general structural Formula II may be:

(16) p-(2-methoxy-benzoyl)-aminobenzoate of N-diethyl-methyl-ammonium-ethyl-iodide
(R=CH$_3$; R$_1$=H; Y=(CH$_2$)$_2$; R$_2$=R$_3$=C$_2$H$_5$; X=I)
(melting point=198–200° C.).

(17) p - (2-ethoxy-benzoyl)-aminobenzoate of N-diethyl-methyl-ammonium-ethyl iodide
(R=C$_2$H$_5$; R$_1$=H; Y=(CH$_2$)$_2$; R$_2$=R$_3$=C$_2$H$_5$; X=I)
(melting point=200° C. with decomposition).

(18) p - (2-ethoxy-benzoyl)-aminobenzoate of N-dimethyl-methyl-ammonium-isopropyl iodide
(R=C$_2$H$_5$; R$_1$=H; Y=CH$_3$—CH—CH$_2$;
R$_2$=R$_3$=CH$_3$; X=I).
(melting point=212–214° C. with decomposition).

(19) p - (2 - ethoxy-benzoyl) - aminobenzoate of N-piperidino-methyl-ethyl-iodide
(R=C$_2$H$_5$; R$_1$=H; Y=(CH$_2$)$_2$; R$_2$;
R$_3$=C$_5$H$_{10}$; X=I)
(melting point=238–239° C. with decomposition).

(20) p-[2-(n-butoxy)-benzoyl]-aminobenzoate of N-diethyl-methyl-ammonium-ethyl iodide
(R=n-C$_4$H$_9$; R$_1$=H; Y=(CH$_2$)$_2$; R$_2$=R$_3$=C$_2$H$_5$; X=I)
(melting point=155–157° C.).

(21) p-[2-(n-amyloxy)-benzoyl]-aminobenzoate of N-diethyl-methyl-ammonium-ethyl iodide
(R=n-C-H$_{11}$; R$_1$=H; Y=(CH$_2$)$_2$; R$_2$=R$_3$=C$_2$H$_5$; X=I)
(melting point=163–166° C.).

(22) p-[2-(n-octyloxy)-benzoyl]-aminobenzoate of N-diethyl-methyl-ammonium-ethyl iodide
(R=n-C$_8$H$_{17}$; R$_1$=H; Y=(CH$_2$)$_2$; R$_2$=R$_3$=C$_2$H$_5$; X=I)
(melting point=136–138° C.).

(23) p-[2-(n-octyloxy)-benzoyl]-aminobenzoate of N-diethyl-methyl-ammonium-ethyl bromide
(R=n-C$_8$H$_{17}$; R$_1$=H; Y=(CH$_2$)$_2$;
R$_2$=R$_3$=C$_2$H$_5$; X=Br)
(melting point=166–168° C.).

(24) p-[2-(n-nonyloxy)-benzoyl]-aminobenzoate of N-diethyl-methyl-ammonium-ethyl bromide
(R=n-C$_9$H$_{19}$; R$_1$=H; Y=(CH$_2$)$_2$;
R$_2$=R$_3$=C$_2$H$_5$; X=Br)
(melting point =147–149° C.).

(25) p-[2-(n-nonyloxy)-benzoyl]-aminobenzoate of N-diethyl-methyl-ammonium-ethyl iodide
(R=n-C$_9$H$_{19}$; R$_1$=H; Y=(CH$_2$)$_2$; R$_2$=R$_3$=C$_2$H$_5$; X=I)
(melting point=127–130° C.).

(26) p-[n-decyloxy)-benzoyl]-aminobenzoate of N-diethyl-methyl-ammonium-ethyl iodide
(R=n-C$_{10}$H$_{21}$; R$_1$=H; Y=(CH$_2$)$_2$; R$_2$=R$_3$=C$_2$H$_5$; X=I)
(melting point=115–117° C.).

(27) p - [2-(n-dodecyloxy)-benzoyl]-aminobenzoate of N-diethyl-methyl-ammonium-ethyl iodide
(R=n-C$_{12}$H$_{25}$; R$_1$=H; Y=(CH$_2$)$_2$; R$_2$=R$_3$=C$_2$H$_5$; X=I)
(melting point=81–83° C.).

(28) p - (2-ethoxy-5-chloro-benzoyl)-aminobenzoate of N-diethyl-methyl-ammonium-ethyl iodide
(R=C$_2$H$_5$; R$_1$=Cl; Y=(CH$_2$)$_2$; R$_2$=R$_3$=C$_2$H$_5$; X=I)
(melting point=207–209° C.).

These compounds possess a remarkable pharmacological activity and are utilizable in several fields of therapeutics. In particular, they present anti-spastic-spasmolytic activities and coronary-dilatatory properties.

The present invention also includes the processes for making the above-mentioned products. Compounds of the structural Formula I may be prepared by condensation of the 2-alkyloxy-benzoyl-chlorides or of the analogous 5-substituted compounds, with the appropriate p-aminobenzoates of N-dialkylamino-alkyl (or N-piperidino-alkyl).

Alternatively p-(2-alkyloxy-benzoyl)-aminobenzoic acids or the analogous 5-substituted compounds may be esterified with the appropriate N-dialkylamino-ethanol (or N-piperidino-ethanol) in the presence of concentrated H$_2$SO$_4$; or with the appropriate N-dialkylamino-alkyl-halide (or N-piperidino-alkyl-chloride) in an alkaline medium. The chlorides of the p-(2-alkyloxy-benzoyl)-aminobenzoic acids or the analogous 5-substituted compounds may be condensed with the appropriate N-dialkyl-amino-ethanol (or N-piperidino-ethanol). The p-(2-alkyloxy-benzoyl)-aminobenzoates-alkyl or the analogous 5-substituted compounds may be subjected to alcoholysis with the appropriate N - dialkylamino - ethanol (or N-piperidino-ethanol), or the p-(2-alkyloxy-benzoyl)-amino-benzoates of chloro-alkyl may be reacted with the appropriate dialkylamine (or piperidine).

The invention is illustrated by the following examples, it being understood that these are by way of illustration only.

Examples A to D illustrate methods for the preparation of p-[2-(n-butoxy)-benzoyl]-aminobenzoate of N-diethyl-amino-ethyl-compound above.

EXAMPLE A 21.20 grams (0.1 mole) of o-butoxy-benzoyl-chloride and aqueous 10% NaOH are added at room temperature, with stirring and by slow dropping to 23.63 grams (0.1 mole) of 2-diethylamine-ethyl-p-aminobenzoate in 100 cubic centimetres of water, in such a manner as to keep the reaction mixture slightly alkaline. After concluding the slow dropping the solution is kept under stirring for one hour and then the precipitate is collected. This precipitate is dried and recrystallized from hexane, has a melting point of 81–82° C.

EXAMPLE B

To 31.3 grams (0.1 mole) of p-[2-(n-butoxy)-benzoyl]-aminobenzoate acid in 300 cubic centimetres of ethanol, are added 4 grams (0.1 mole) of finely ground NaOH and the whole is heated to reflux for one hour. Then 20.25 grams (0.15 mole) of 2-diethylamino-ethyl-chloride are slowly dropped under stirring and the heating is continued for 4 hours. After cooling, the sodium chloride formed is filtered off and the solvent is separated by distillation, and the excess of the base, under a reduced pressure. The residue, recrystallized from hexane, has a melting point of 81–82° C.

EXAMPLE C

To 11.7 grams (0.1 mole) of N-diethylamino-ethanol in 200 cubic centimetres of anhydrous pyridine are added by careful dropping, 34.7 grams (0.1 mole) of the chloride of p-[2-(n-butoxy)-benzoyl]-aminobenzoic acid and the mixture is heated in a water-bath for 3 hours. The solvent is then separated by vacuum concentration, the residue is taken up with water, alkalinized and extracted with ether. The collected ether extracts, anhydridized owing to the separation of the solvent, leave a residue which, recrystallized from hexane, has a melting point of 81– 82° C.

EXAMPLE D

A mixture formed by 34.1 grams (0.1 mole) of p-[2-(n-butoxy)-benzoyl]-aminobenzoate of ethyl in 117 grams (1 mole) of n-diethylamino-ethanol, to which is added a solution of 0.34 gram of metal sodium in 25 grams of N-diethylamino-ethanol, is distilled with a reduced pressure to the dry state. The residue obtained, repeatedly recrystallized from hexane, has a melting point of 81–82° C.

Compounds according to the structural Formula II may be prepared by reaction of the corresponding tertiary amino-alkyl esters of the structural Formula I with methylating agents such as methyl chloride, bromide, iodide or sulphate.

An example relating to the preparation of p-[2-(n-butoxy) - benzoyl] - aminobenzoate of N - diethyl-methyl-ammonium-ethyl iodide is given below.

EXAMPLE E

To 41.25 grams (0.1 mole) of p-[2-(n-butoxy)-benzoyl]-aminobenzoate of N-diethylamino-ethyl in 400 cubic centimetres of ethanol are added 28.4 grams (0.2 mole) of methyl iodide and the mixture is kept at room temperature under stirring for 5 hours. After standing overnight, the precipitate is collected and recrystallized from ethanol and has a melting point of 155–157° C.

What is claimed is:

1. A member selected from the group consisting of compounds which are p-(2-alkyloxy-benzoyl)-aminobenzoates of N-alkylamino-alkyl, corresponding to the general structural formula:

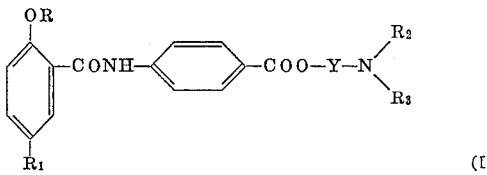

(I)

and chlorohydrates and hydrochlorides thereof, in which R is an alkyl group containing 1 to 12 carbon atoms; $R_1$ is H or Cl; Y is a straight or branched alkyl chain containing 2 or 3 carbon atoms; and $R_2$ and $R_3$ are alkyl groups containing 1 or 2 carbon atoms or together with the nitrogen atom are piperidine.

2. A compound according to claim 1, which is p-(2-methoxy-benzoyl)-aminobenzoate of N-diethylaminoethyl.

3. A compound according to claim 1, which is p-(2-ethoxy-benzoyl)-aminobenzoate of N-diethylaminoethyl.

4. A compound according to claim 1, which is p-(2-ethoxy-benzoyl)-aminobenzoate of N-dimethylaminoisopropyl.

5. A compound according to claim 1, which is p-(2-ethoxy-benzoyl)-aminobenzoate of N-piperidinoethyl.

6. A compound according to claim 1, which is p-[2-(n-butoxy)-benzoyl]-aminobenzoate of N-diethylaminoethyl.

7. A compound according to claim 1, which is p-[2-(n-amyloxy)-benzoyl]-aminobenzoate of N - diethylaminoethyl.

8. A compound according to claim 1, which is p-[2-(n-octyloxy)-benzoyl]-aminobenzoate of N - diethylaminoethyl.

9. A compound according to claim 1, which is p-[2-(n-nonyloxy)-benzoyl]-aminobenzoate of N - diethylaminoethyl chlorohydrate.

10. A compound according to claim 1, which is p-[2-(n-decyloxy)-benzoyl]-aminobenzoate of N - diethylaminoethyl hydrochloride.

11. A compound according to claim 1, which is p-[2-(n-dodecyloxy) - benzoyl] - aminobenzoate of N-diethylamino-ethyl hydrochloride.

12. A compound according to claim 1, which is p-(2-methoxy-5-chloro-benzoyl)-aminobenzoate of N-diethylamino-ethyl.

13. A compound according to claim 1, which is p-(2-ethoxy - 5 - chloro-benzoyl)-aminobenzoate of N-diethylamino-ethyl.

14. A compound according to claim 1, which is p-[2-(n-butoxy)-5-chloro-benzoyl]-aminobenzoate of N-diethylamino-ethyl.

15. A compound according to claim 1, which is p-[2-(n-amyloxy-5-chloro-benzoyl]-aminobenzoate of N-diethylamino-ethyl.

16. A compound according to claim 1, which is p-[2-(n-octyloxy)-5-chloro-benzoyl]-aminobenzoate of N-diethylamino-ethyl.

17. A member selected from the group consisting of lower alkyl quaternary ammonium salts of p-(2-alkyloxybenzoyl)-amino-benzoates of N-alkylamino-alkyl, corresponding to the general structural formula:

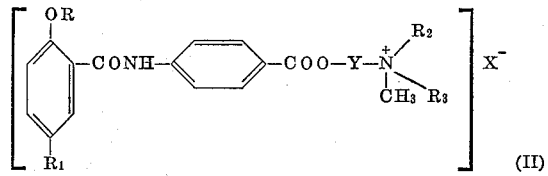

(II)

where R is an alkyl group containing 1 to 12 carbon atoms; $R_1$ is H or Cl; Y is a straight or branched alkyl chain containing 2 or 3 atoms of carbon; $R_2$ and $R_3$ are alkyl groups containing 1 or 2 atoms of carbon or together with the nitrogen atom are piperidine; and X is an anion selected from the group of $Cl^-$, $Br^-$, $I^-$ and $SO_4^{--}$.

18. A compound according to claim 17, which is p-(2-methoxy-benzoyl)-aminobenzoate of N - diethyl-methyl-ammonium-ethyl iodide.

19. A compound according to claim 17, which is p-(2-ethoxy-benzoyl)-aminobenzoate of N-diethyl-methyl-ammonium-ethyl-iodide.

20. A compound according to claim 17, which is p-(2-ethoxy-benzoyl)-aminobenzoate of N-dimethylmethyl-ammonium-isopropyl iodide.

21. A compound according to claim 17, which is p-(2-ethoxy-benzoyl)-aminobenzoate of N-piperidino-methyl-ethyl-iodide.

22. A compound according to claim 17, which is p-[2-(n-butoxy)benzoyl]-aminobenzoate of N-diethyl-methyl-ammonium-ethyl iodide.

23. A compound according to claim 17, which is p-[2-(n-amyloxy-benzoyl]-aminobenzoate of N-diethyl-methyl-ammonium-ethyl-iodide.

24. A compound according to claim 17, which is p-[2-(n-octyloxy)-benzoyl]-aminobenzoate of N-diethyl-methyl-ammonium-ethyl iodide.

25. A compound according to claim 17, which is p-[2-(n-octyloxy-benzoyl]-aminobenzoate of N-diethyl-methyl-ammonium-ethyl bromide.

26. A compound according to claim 17, which is p-[2-(n-nonyloxy)-benzoyl]-aminobenzoate of N-diethyl-methyl-ammonium-ethyl iodide.

27. A compound according to claim 17, which is p-[2-(n-nonyloxy)-benzoyl]-aminobenzoate of diethyl-methyl-ammonium-ethyl bromide.

28. A compound according to claim 17, which is p-[2-(decyloxy)-benzoyl]-aminobenzoate of N-diethyl-methyl-ammonium-ethyl iodide.

29. A compound according to claim 17, which is p-[2-(n-dodecyloxy) - benzoyl] - aminobenzoate of N-diethyl-methyl-ammonium-ethyl iodide.

30. A compound according to claim 17, which is p-(2-ethoxy - 5 - chloro-benzoyl)-aminobenzoate of N-diethyl-methyl-ammonium-ethyl iodide.

References Cited

Guidicelli et al.: Compt. rend. 243, 1931–3 (1956).
Morrison et al.: Organic Chemistry, 2nd edition," Allyn and Bacon, Inc., Boston, Mass. (1966), pp. 467, 666, 671, 673, 748, and 749.

HENRY R. JILES, Primary Examiner

G. T. TODD, Assistant Examiner

U.S. Cl. X.R.

260—472, 473, 521, 999